United States Patent [19]
Bussan et al.

[11] Patent Number: 4,901,625
[45] Date of Patent: Feb. 20, 1990

[54] APPARATUS AND METHOD FOR POSITIONING EQUIPMENT

[75] Inventors: John E. Bussan, Oak Park; Christopher F. Bussan, Schaumburg; Bruce H. Blair, Oak Park, all of Ill.

[73] Assignee: Increcyl, Inc., Franklin Park, Ill.

[21] Appl. No.: 293,752

[22] Filed: Jan. 3, 1989

[51] Int. Cl.$^4$ ............................................. F15B 13/16
[52] U.S. Cl. ......................................... 91/361; 91/389; 91/471; 318/594; 318/601; 364/182; 364/476
[58] Field of Search ................... 364/182, 476, 167.01; 318/592, 594, 601, 603; 91/361, 362, 364, 389; 60/368

[56] References Cited

U.S. PATENT DOCUMENTS

| | | | |
|---|---|---|---|
| 3,850,105 | 11/1974 | Aronstein et al. | 318/592 X |
| 4,481,768 | 11/1984 | Goshorn et al. | 60/415 X |
| 4,513,234 | 4/1985 | Nozawa et al. | 318/594 |
| 4,599,547 | 7/1986 | Ho | 318/594 |
| 4,741,247 | 5/1988 | Glomeau et al. | 60/413 X |
| 4,756,229 | 7/1988 | Drakeley | 91/361 X |

FOREIGN PATENT DOCUMENTS 3513661 10/1986 Fed. Rep. of Germany ........ 91/361

*Primary Examiner*—Edward K. Look
*Attorney, Agent, or Firm*—Willian Brinks Olds Hofer Gilson & Lione

[57] ABSTRACT

A system for positioning equipment quickly and accurately over a plurality of desired positions by employing a "long move" mode of operation and a "short move" mode of operation to adapt the operation of the positioning system to variable and changing conditions. The system generally includes a microprocessor as the controlling means, a controlled valving means, a pressure source coupled to the valving means, an encoder sensing means and a positioning means defined by a pneumatic cylinder.

45 Claims, 8 Drawing Sheets

APPARATUS AND METHOD FOR POSITIONING EQUIPMENT

TECHNICAL FIELD

This invention relates to automated systems used for positioning loads, and, more particularly, to a self-adjusting, electropneumatic apparatus for proportionally controlling the movement and positioning of a drive cylinder coupled to a load use in material handling, transporting parts, pick-and-place operations, small parts assembly, and other such similar operations.

BACKGROUND ART

Electromechanical systems used in high-accuracy positioning applications which use hydraulically and pneumatically transmitted force are known; pneumatically-controlled systems used in material handling and other such similar operations are also known. Until recently, pneumatic systems were almost entirely limited to on/off control, however, the need for increased capabilities in such systems has lead to the development of programmable pneumatic equipment capable of incremental control to produce intermediate positions along a path.

Such prior control systems operate in either an open or closed-loop mode. In a closed-loop system, an output position is continuously monitored and compared to a set point (the desired point), and the system strives to reduce any deviation of position from the set point to zero. In an open-loop system, output positions are obtained by proportioned signals, which are assumed to provide a current position, and any deviation between the actual position and the set point is ignored.

Pneumatically driven systems contain many unpredictable and time dependent variables that prevent open-loop control systems from providing reliable positioning of a load and that interfere with the effective use of closed-loop control systems in most applications. Such variables include the varying break-away forces needed to move sealed pneumatically driven elements, such as pistons and valves, because of the age and condition of the seal-forming members and the condition of the interfacing surfaces against which the seal-forming members form their seals. Such variables also include the varying frictional forces imposed on moving seal-forming members because of their age and condition and because of the condition of the interfacing surfaces over which such seal-forming members are driven. This complex and unpredictable set of variables is further complicated by variations of load and vertical forces due to the age and conditions of the load and the movable joints interconnecting the load and the pneumatic load driving members, the varying positions of the load with respect to earth and the varying contributions of the force of gravity to the load forces imposed on the pneumatic load driving members because of the varied positions and desired changes of position of the load and, of course, due to the break-away and moving frictional forces of the moving elements of the load.

Furthermore, the reliability and effective operation of closed-loop pneumatically driven positioning systems is comprised by variation in the effective force imposed on pneumatically driven members because of unpredictable variation in the applied pressure, pressure build-up and pressure application times due to the variable factors described above, limitations in the ability of pneumatic pressure controlling devices to maintain constant pressures within close tolerances and their wear and increasing unreliability due to age, the conditions of the orifices, passageways and elements through which operating air pressures are applied to pneumatic load driving members. It must be remembered, of course, that compressed air generally includes and carries water vapor that is not always reliably removed from the compressed air by air dryers and this water vapor imposes another unpredictable and time dependent variable on pneumatically driven positioning systems. Finally, the human operators themselves aggravate an already enormously complex and unpredictable problem with their unpredictable behavior.

The ability to provide reliable closed-loop pneumatic positioning systems is even further complicated by the inadequacies of available pneumatic components.

Closed-loop pneumatic control systems contain several components generally including a positioning drive, i.e., a controlled valve and a pneumatic cylinder, a load as the driven element, a feedback sensor or displacement pickup, an electronic controller, and an electronic amplifier that adjusts the controller power level to drive the controlled valve.

The positioning drive commonly includes a continuous-acting valve as the control element. The valve is a vital element of the control loop. The precision and speed of the valve must exceed that of the control loop as a whole. Thus, requirements for the control loop generally define the valve choice. Examples of continuous-acting valves available for pneumatic applications include digital, proportional, and servo valves. Digital valves use an electrical step motor to position the valve spool. An important disadvantage of digital valves is their lack of response due to step motor speed limitations.

Proportional valves use proportional solenoids for direct actuation of a valve spool. If spool travel is not controlled by any other means, these valves suffer from hysteresis, and in either case are not very fast.

Servovalves, on the other hand, are extremely fast and precise, however, they are expensive and their cost limits their uses.

Generally, the response of the control element must be faster than that of the control loop as a whole. Valve speed determines how rapidly the system compensates for unwanted deviations. One rule of thumb is that the stability of a closed-loop controlled system requires the valve natural frequency to be at least three times that of the cylinder and load to be moved. For most material-handling operations, the cylinder natural frequency alone is in the 1 to 5-Hz range.

Most valves, with the exception of digital valves, are analog in operation. Hence, the electronic amplifier is usually analog to correspond to the controlled valve. The amplifier drives a solenoid output stage, for example, by controlling valve-spool travel.

The controller may either be analog or digital. Both types require set point inputs to provide specified outputs such as required cylinder position. Accuracy of the output variable depends on the consistency of the set point input. Noise and drift problems are inherent to analog controllers, and can have a detrimental effect on system position. Digital controllers do not experience these problems and are preferred. Because of all of the above variables, it has been virtually impossible for pneumatic positioning systems to make reliably small changes in local position, for example, because of unpredictable and variable break-away forces and inertial forces, and to achieve reliable position for these reasons and all of those set forth above.

As noted above, pneumatic closed-loop positioning systems are substantially affected by fluid compressibility among other factors. The result is a complex, completely non-linear closed-loop system, where variations in constants cannot be reliably corrected for wear and age, stroke, pressure, load and the like.

DISCLOSURE OF THE INVENTION

This invention comprises an adaptive pneumatic positioning system which is able to quickly and accurately position a load at a large number of varied positions and in very small increments of position and movement and to maintain accurate positioning and movement notwithstanding the many variables inherent in pneumatic systems. The invention thus provides a powerful, fast, accurate positioning system that is much less expensive than hydraulic systems and conventional pneumatic positioning systems presently available. Generally, the invention incorporates software, a digital encoder and conventional on/off valves, among other things, to allow a pneumatic drive cylinder to be moved quickly and accurately to any position upon command. The incremental motion achieved by the cylinder of the invention may be accomplished with accuracy up to approximately ±0.005 inches (0.127 mm).

The system of this invention generally includes a microprocessor as the controlling means, a controlled valving means, a pressure source coupled to the valving means, a sensing means and a positioning means mechanically coupled to the load while also coupled to the valving means. The system may further include a braking means to secure the positioning means in a stationary position if desired. The system of this invention is adaptive to changing conditions of operation and is operated in novel manner including two types of moves of the positioning means: a long move and a short move.

In the invention, the system microprocessor operates the system with a "long move" operation and a "short move" operation to adapt the operation of the positioning system to variable and changing conditions. In operation, the microprocessor develops a table of "long move" data and a table of "short move" data. The long move data includes a plurality of predetermined offset distance values to correspond with a plurality of position changes of the load. For each change of position of the load, the system develops and stores a single offset distance which represents the effect of system variables on the resulting position of the load during the desired change of position and a minimum distance for operation in the "long move" mode. If a desired change of position is greater than the offset distance stored in the table of long move data for the desired change of position, the microprocessor operates the controlled valving means and monitors the sensing means. The controlled valving means is operated by the microprocessor until the microprocessor determines from the sensed position of the load in motion and the stored offset distance value that operation of the controlled valving means should be discontinued to yield the desired position.

By monitoring the sensing means, the microprocessor determines if the load is in the desired position, and if the load is not in the desired position after its movement has stopped, the microprocessor increases or decreases the stored offset distance value by an appropriate corrective value.

If the desired change of position is less than the stored offset distance value, the system operates in the "short move" mode using the table of "short move" data. The short move data includes a plurality of short move increments or intervals of time and an associated distance of movement of the load. When the system operates in the short move mode of operation, the microprocessor operates the controlled valving means directly for the short move time interval corresponding to the change of position and determines the position of the load from the sensing means upon completion of the move, and if the load is not in the desired position, the microprocessor increases or decreases the stored short move time interval by an appropriate corrective value. For each desired change of position, if the system does not yield the desired load position within specified limits, it repeats its operation, or iterates, until the load is positioned within the specified limits.

The positioning means provided by this invention may comprise a pneumatically controlled rotary actuator or a pneumatically controlled linear-drive cylinder. The system of this invention including the rotary actuator may further include a rotary electromagnetic brake while an alternative embodiment incorporating the linear-drive cylinder may further include a linear cylinder brake.

This invention thus also provides a method by which the positioning of a load may be quickly and accurately controlled. The method is carried out as described above by sensing the position of the load, determining the desired position of the load, determining a first distance the load must travel to reach the desired position, comparing the first distance to a first set of long move data or to a second set of short move data, whichever is appropriate, generating an output to operate a valving means and a positioning means, moving the load in the direction of the desired position, sensing the position of the load after this its motion has stopped, determining whether the load is positioned within the specified limits of the desired position, and adjusting the first set of long move data or the second set of short move data, as appropriate.

Further features of the invention will be apparent from the following drawings and disclosure of preferred embodiments of the invention and their method of operation.

BEST MODE FOR CARRYING OUT THE INVENTION

Figure 1:
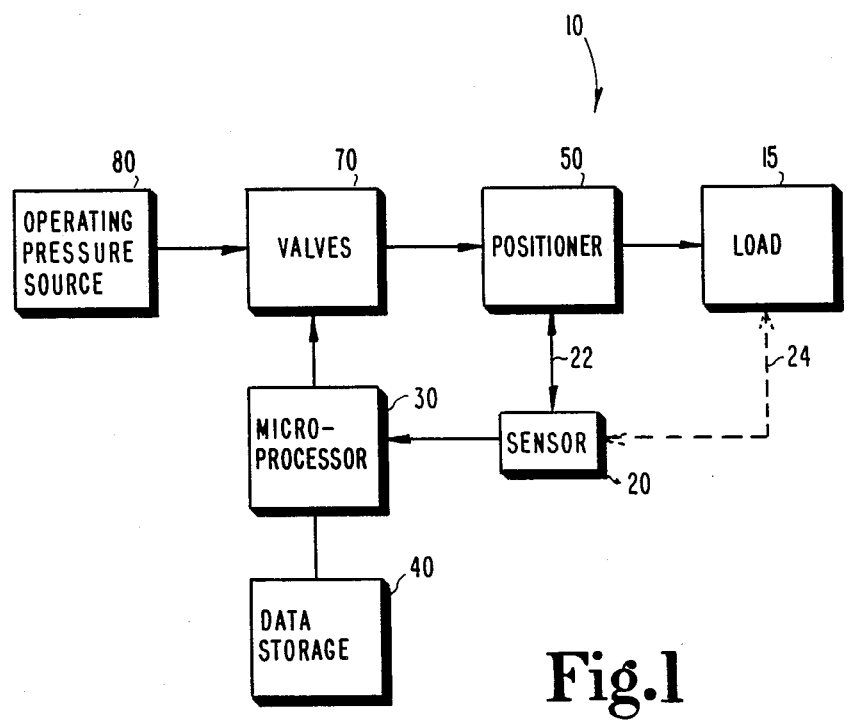
FIG. 1 is a schematic illustration of a positioning system provided by the invention.

FIG. 1 shows a system 10 for positioning a load 15, comprising means 20 for sensing the position of the load, electronic data processing means 30, data-storage means 40 coupled to electronic data processing means 30, positioning means 50 mechanically coupled to load 15, valving means 70 coupled to positioning means 50, and pressure source 80 coupled to valving means 70. Sensing means 20 is preferably arranged so that it senses the position of the positioning means indicated by double arrow 22; however, sensing means 20 may be arranged so that it senses the position of the load directly as indicated by double phantom arrow 24.

Figure 2:
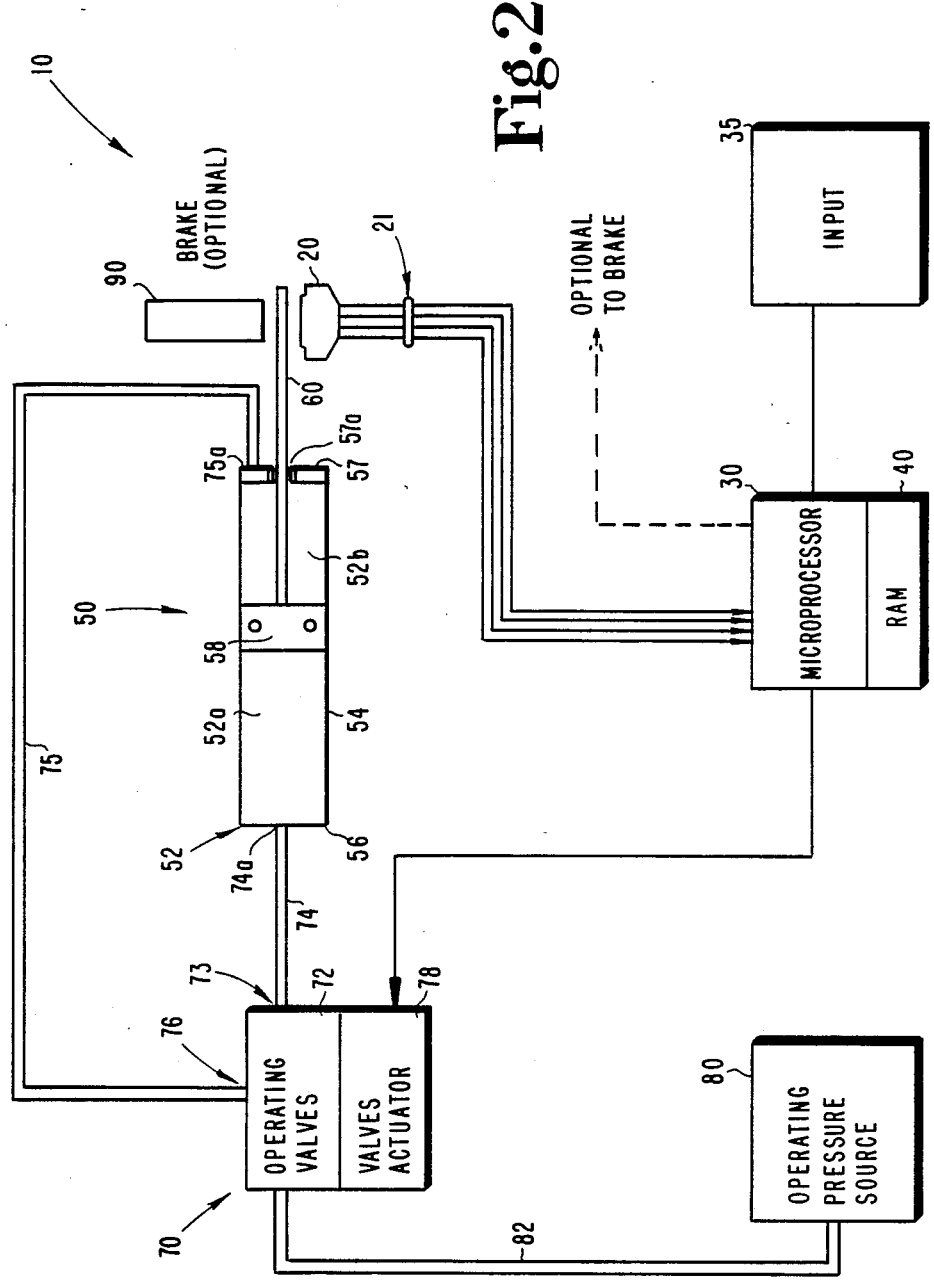
FIG. 2 is an illustration of a positioning system provided by the invention with a linear-drive cylinder shown in a cross-section through its center axis and with the remaining portion of the system being schematically represented.

A preferred embodiment of the invention is shown in greater detail in FIG. 2 wherein positioning means 50 comprises linear-drive cylinder 52 (shown in cross section) having cylindrical side wall 54 and end walls 56, 57 and carrying piston head 58 therein. Piston rod 60 is connected to piston head 58 and extends through a sealed opening 57a formed in end wall 57 of the cylinder for connection with load 15 (not shown). Piston head 58 defines first chamber 52a and second chamber 52b within cylinder 52. Positioning means 50 and sensing means 20 may comprise a pneumatic or compressed air CYLNUC Cylinder manufactured by NSD Corporation.

Sensor 20 is shown in FIG. 2 positioned adjacent piston rod 60 whereby sensor 20 senses the position of the load by sensing directly the position of piston rod 60. Sensor 20 may be arranged to sense the position of piston head 58, or sensor 20 may be arranged to sense the position of the load directly. Sensing devices of the type incorporated into the system provided by this invention include the HEDS-9200 Series linear optical incremental encoder module manufactured by Hewlett Packard. When positioning system 10 is operating using such a linear sensor device, a code strip must be affixed to the object being sensed, i.e., piston rod 60, piston head 58, or load 15, to permit the module to detect linear position. As is known in the industry, the sensor device has an emitting portion and a detecting portion which, coupled with the code strip, translates linear motion into a two-channel digital output. The sensor module contains a single Light Emitting Diode (LED) as its light source and collimates the light into a parallel beam by means of a single lens located directly over the LED. Opposite the emitter is the integrated detector circuit which consists of multiple sets of photo detectors and the signal processing circuitry necessary to produce the digital output. The code strip moves between the emitter and detector, causing the light beam to be interrupted by the pattern of spaces and bars on the code strip. The photo diodes which detect these interruptions are arranged in a pattern that corresponds to the count density of the code strip. These detectors are also placed such that a light period on one pair of detectors corresponds to a dark period on the adjacent pair of detectors. The photo diode outputs are then fed through a signal processing circuitry within the module resulting in signals which are received by two comparators which produce the final outputs for the dual-channel output. Due to this integrated phasing technique, the digital output of the first channel is in quadrature with that of the second channel (90° out of phase). When the code strip moves in relation to the sensor device, one of the two channels will lead the other channel by approximately 90°. If the code strip moves in the opposite direction, the latter channel will lead the forward channel. The digital output of sensor 20 is coupled to microprocessor 30 by cable 21.

Microprocessor 30 is connected with data-storage means 40 which may be a random access memory included as an integral part of microprocessor 30. An input means 35 is also preferably connected with microprocessor 30 to provide load positioning information. Input means 35 may be a keyboard or other manually operated input means for a central processing unit or any computer which is capable of providing digital information to microprocessor 30.

Valving means 70 includes operating valves portion 72 and valve actuator portion 78. Operating valves portion 72 preferably includes first valve 73 arranged to control the delivery of pressurized fluid through first conduit 74, and second valve 76 arranged to control the delivery of pressurized fluid through second conduit 75. Valves 73 and 76 are not shown or described in more detail as each valve is a conventional on/off valve commonly available in the industry. First conduit 74 is connected to orifice 74a formed in end wall 56 of cylinder 52 and opening into first chamber 52a. Second conduit 75 is connected at orifice 75a formed in end wall 57 of cylinder 52 and opening into chamber 52b. It is to be appreciated that it is not essential that orifices 74a and 75a be positioned at end walls 56 and 57, respectively, as long as each opens into separate chambers 52a or 52b.

Positioning system 10 further includes operating pressure source 80 which delivers pressurized operating fluid, preferably compressed air, to valving means 70 through delivery conduit 82.

Brake 90 may further be integrated into positioning system 10 as an option if desired. Brake 90 may be electrically powered and arranged adjacent piston rod 60 to mechanically engage piston rod 60 when actuated. The brake may comprise a linear brake which can be applied against piston rod 60 to provide static or dynamic braking. Braking can be effected by microprocessor 30 immediately after positioning means 50 becomes stationary and can be removed by microprocessor 30 immediately preceding the actuation of valving means 70. Preferably, the brake will activate and engage piston rod 60 when electrically de-energized to provide failure safety. Such a linear brake is manufactured by Inertia Dynamics, Inc., Collinsville, Connecticut.

Alternatively, the linear brake may use a separate air cylinder to apply braking force to a long band of metal which is attached to piston rod 60 or piston head 58 and which moves in cooperation with the piston rod. Upon actuation, the air cylinder presses the band of metal against a stationary part of cylinder 52 causing friction and resisting further movement of the piston rod.

Figure 3:
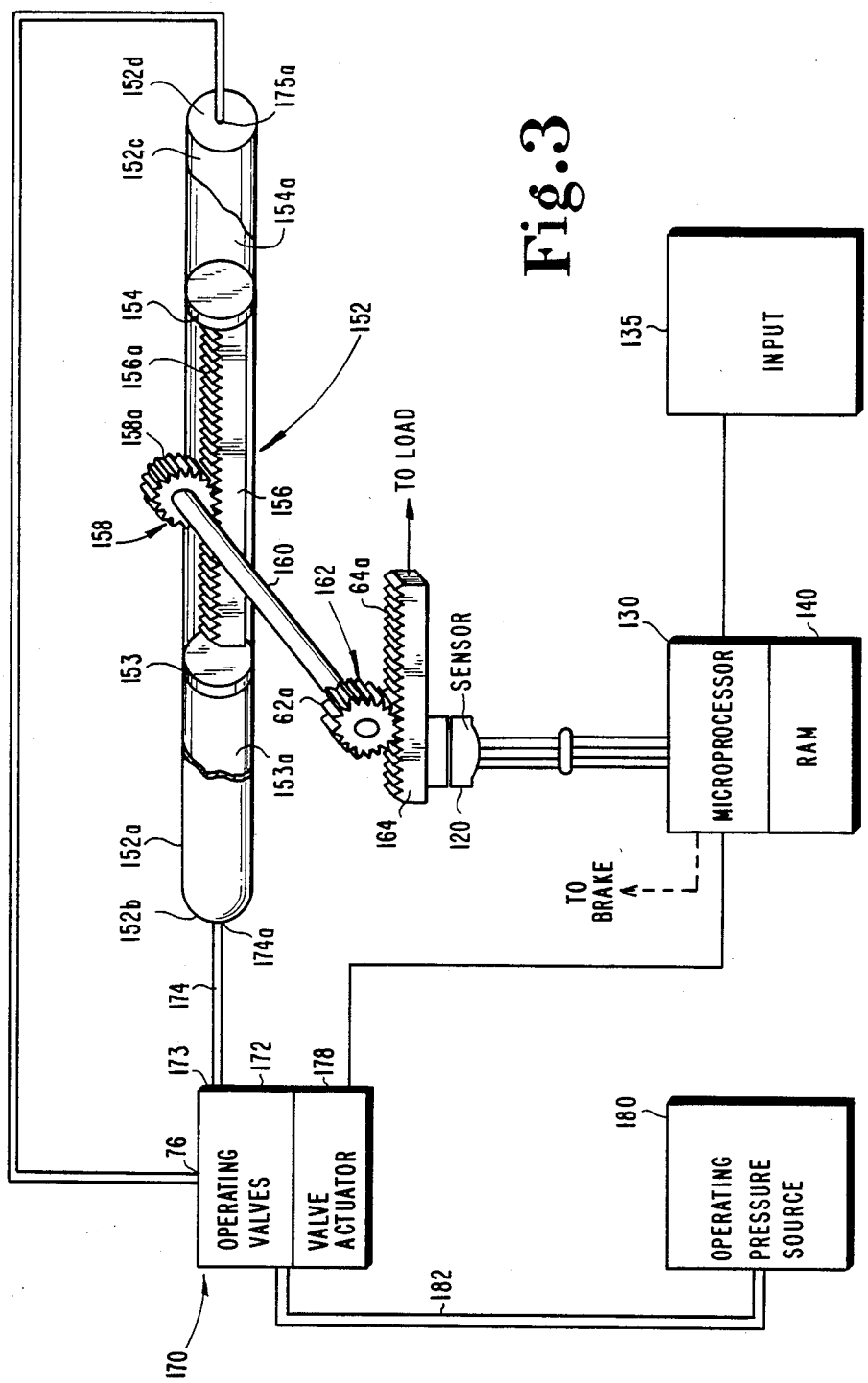
FIG. 3 is an illustration of a positioning system provided by the invention with a rotary actuator shown in a partially broken-away perspective view and with the remaining portion of the system being schematically illustrated.

Another embodiment provided by the system of this invention is shown in FIG. 3 comprising sensing means 120, microprocessor 130, data-storage means such as random access memory means 140, input means 135 coupled to microprocessor 130, positioning means defined by rotary actuator 152, valving means 170 coupled to rotary actuator 152, operating pressure source 180 delivering pressurized fluid through delivery conduit 182 to valving means 170, and first conduit 174 and second conduit 175 for delivering the operating pressurized fluid to rotary actuator 152.

Rotary actuator 152, shown in a partially brokenaway perspective view, includes first piston head 153 and second piston head 154 carried within cylindrical side wall 152a and end walls 152b, first movable rack 156 interposed between first piston head 153 and second piston head 154, first gear 158 arranged in communication with first movable rack 156 and affixed to shaft 160, which is in turn affixed to second gear member 162, and second movable rack 164 positioned in communication with second gear member 162. First gear 158 and second gear 162 are securely mounted to shaft 160 which is journaled for rotation, thereby allowing the first and second gears and the journaled shaft to rotate cooperatively. First piston head 153 defines first chamber 153a within cylindrical side wall 152a and second piston head 154 defines a second chamber 154a within cylindrical side wall 152c.

A rotary actuator which may perform as needed by this invention is the Bimba Pneu-Turn rotary actuator manufactured by the Bimba Manufacturing Company. A vane type rotary actuator, made by many manufacturers, may also be used in place of the rack and pinion type described above.

Valving means 170 includes operating valves portion 172 and valve-actuator portion 178. Operating valves portion 172 further includes a first valve 173 arranged to control the delivery of pressurized fluid through first conduit 174 and a second valve 176 arranged to control the delivery of pressurized fluid through second delivery conduit 175. Valves 173 and 176 are not shown or described in more detail as each valve is a conventional on/off valve commonly available in the industry.

First conduit 174 is connected at one end with first valve 173 and connected at the other end to orifice 174a formed in end wall 152b of cylinder 152. First conduit 174 directs pressurized fluid from valving means 170 to first chamber 153a of rotary actuator 152. Second conduit 175 is connected at one end to second valve 176 and connected at the other end to orifice 175a formed in end wall 152d. It is not essential that the positioning of orifices 174a, 175a be shown in FIG. 3; orifices 174a and 175a may be formed in the cylindrical side walls 152a and 152c. It is only preferable that pressurized fluid delivered by first conduit 174 be delivered into first chamber 153a; and that pressurized fluid delivered by second conduit means 175 be delivered into second chamber 154a.

In operation of the alternative embodiment shown in FIG. 3, pressurized operating fluid is directed into first chamber 153a or second chamber 154a urging first piston head 153 or second piston head 154 in an opposite direction. For example, if pressurized operating fluid is directed into first chamber 153a at orifice 174a, first piston head 153 is urged to the right, thereby cooperatively displacing first rack 156 and second piston head 154 to the right. As first rack 156 moves toothed portion 156a formed thereon engages toothed portion 158a of first gear 158 and rotates first gear 158, which cooperately rotates journaled shaft 160 and second gear 162. Toothed portion 162a formed on second gear 162 engages toothed portion 164a formed on second movable rack 164 and likewise moves second movable rack 164 as it rotates. Second movable rack 164 is mechanically coupled to a load (not shown) and thereby moves the load as the rotary actuator is driven by the operating pressurized fluid.

As shown in FIG. 3, sensor 120 is arranged adjacent second movable rack 164 to sense its position and provide a signal indicating load position through cable 121 to microprocessor 130. An alternative embodiment may provide that sensor 120 be arranged adjacent first movable rack 156 to sense the position of the load. An even further embodiment may provide that sensor 120 be arranged adjacent the load to sense its position directly and provide this information to the microprocessor.

Another embodiment may provide that sensor 120 comprise an optical, incremental encoder coupled to rotating shaft 160 to indicate the position of the load by translating the rotary motion of the shaft into a digital output signal. Such an optical, incremental encoder contains a lensed LED light source, an integrated circuit with detectors and output circuitry, and a code wheel which rotates between the emitter and detector integrated circuitry. Such a sensing device for rotary motion may include a HEDS-5500 Series quick assembly optical encoder manufactured by Hewlett Packard.

As shown in FIG. 3, the alternative embodiment provided by this invention may further include brake 190 as an option. Brake 190 may be connected with rotary actuator 152 and actuated by microprocessor 30 to engage rotary actuator 152 in the same manner as set forth for brake 90 of FIG. 2. Conveniently, brake 190 may be an electromagnetic brake actuated by electrical current.

The system of this invention is not to be limited by the pressure source or positioning means by which the system effects motion of the load. For example, as described above, actuation of the positioning means has been effected by directing pressurized operating fluid such as air to a positioning means cylinder to urge at least one piston carried therein in the desired direction. The motion of the positioning means may be stopped by two methods. The delivery of the operating pressure to the positioning means may be discontinued, thereby removing the motive force and permitting the positioning means to come to an unassisted stop. Secondly, when the positioning means approaches a desired position during a move, the delivery of operating pressure fluid can be continued to the first cylinder and an equal pressure can be applied to an opposing cylinder of the positioning means to counteract the driving force generated in the first cylinder and to bring the positioning means to a stop. The system of this invention is preferably operated with such counter-acting opposed piston-cylinder combinations and with operating pressure applied to opposing cylinders when no motion is desired. To actuate the positioning means, the pressure is discontinued to one of the opposing cylinders creating an imbalance of force in the positioning means and driving the positioning means in the desired direction. Experimentation has proven that this latter method is preferred as the compressed air within the cylinders of the positioning means when the positioning means is stationary resists movement and helps secures the positioning means in a stationary position.

As noted above, the system of the invention provides a novel adaptive operating means and method including operation in a "long move" mode and a "short move" mode to provide accurate positioning of a load notwithstanding aging and changes of the condition of the system components and changes imposed on the system by load variations. Before actual operation of the system is initiated, however, information including the offset distance values for long moves and the time intervals for short moves must be provided to microprocessor 30.

Before the system can initially learn or "characterize" its environment, the physical limits of the travel path of positioning means 50 must be set and this is effected by initially moving positioning means 50 to its most retracted position via input means 35 or via the system operating program stored in data-storage means 40, and resetting the encoder (sensor 20) counter to zero, then moving positioning means 50 to its maximum point of travel to determine the maximum cylinder position count. The value in the encoder position counter is incremented and decremented by the encoder as positioning means 50 travels along its path. The position counts are spaced evenly along the path of the positioning means and the distance between one count and the adjacent counts is approximately equal to the distance the positioning means travels between consecutive pulses emitted by the optical encoders serving as the sensing means. The plurality of position counts are assigned to the path with position count zero at the initial starting point of the positioning means with increasing numerals assigned to each consecutive position count thereafter, with the highest numeral assigned to the position count at the maximum point of travel of the positioning means.

The plurality of position counts is then divided into non-overlapping portions or "cells", each cell being of equal length and having an equal number of position counts located therein. For example, one thousand position counts may be assigned evenly spaced over the path of movement of the positioning means and then the one hundred counts may be divided into ten cells, each cell having ten position counts. As just mentioned, the cells are non-overlapping and equal in length. Thus, cell one has located therein counts 0-99; cell two has counts 100-199; cell three has counts 200-299; cell four has counts 300-399; cell five has counts 400-499; cell six has counts 500-599; cell seven has counts 600-699; cell eight has counts 700-799; cell nine has counts 800-899; and cell ten has counts 900-1000. The number of position counts to be assigned over the path of the positioning means may be determined by the operator, however, it is preferred that the number of position counts be substantially equal to the number of pulses that the sensing means emits over the entire path of travel of the positioning means.

Prior to system operation, the operator thus provides the microprocessor 30 the number of cells he wishes to be assigned to the length of the positioning means travel path. The system operating program provided by the invention then directs positioning means 50 to move from each cell to every other cell along the travel path and determines the offset distance value for each desired move and, more particularly, the positioning means moves from cell one to cell two, back to cell one and then from cell one to cell three, back to cell one and then from cell one to cell four, and so on in a like manner. After the positioning means has moved from cell one to each of cells two through ten, it repeats the process using cell two as the originating cell. In other words, the positioning means starts at cell two and moves to cell one, then back to cell two and from cell two to cell three, then back to cell two and from cell two to cell four, and so on. Each time the positioning means moves from a chosen originating cell to another cell, learn routines present in the operating program stored in microprocessor 30 determine, in combination with sensing means 20, whether the positioning means has stopped at the desired position within the desired cell or within a "learn error band". The learn error band is defined as a specified distance on either side of the desired position within which the positioning means must stop for the system to have successfully "learned" that move. If not, the learn routines determine the difference between the desired position of the load and the current position of the load and adjust the selected distance to move from that originating cell to the desired cell. The positioning means then returns to the originating cell and repeats the move using the adjusted distance value.

If microprocessor 30 and sensing means 20 determine that the positioning means has stopped at least within the learn error band, the system considers that particular move as being "learned" and stores the move coordinates, e.g., originating cell three to desired cell seven, and the respective offset distance value for that particular move in a long move table. As discussed above, the offset distance value is the point along the travel path of the positioning means at which the pressurized operating fluid driving the positioning means is discontinued, thus permitting the positioning means to slide unassisted to the desired position. If double-acting positioning means is used, it may be the point at which the opposing valve is opened permitting the pressure to be applied to the opposing positioning means to slow and stop the movement of the positioning means.

To learn a short move, the operating program stored in the data-storage means directs valving means 70 to move positioning means 50 from each cell to each of many predefined distances and determines, by trial and error, the interval of time valving means 70 must actuate positioning means 50 to move the positioning means from each originating cell to each desired position count. The short move information including these time intervals is then stored in data-storage means 40.

An important point to note is that the offset distance value for a particular move between two cells or the time interval for a particular move between two position counts in one direction is not necessarily the same as the offset distance value or time interval for the move between those same two cells or position counts in the opposite direction. Differences may exist because of variables such as the effect of gravity. For example, the force of gravity may assist the positioning means in moving a load in one direction and may oppose the positioning means in moving the load in the other direction. In addition, the inertial forces imposed on the positioning system by a load may be greater in one direction than in the other direction. For these reasons, among others, a load may move more freely in one direction than in the opposite direction and the offset distance value for the move in one direction may differ from the offset distance value in the other direction, and in a short move, the time interval for a move in one direction may be less than the time interval for the move in the opposite direction. It is possible, of course, that the offset distance value may even be a negative value.

Other factors may, of course, effect the offset distance values and time intervals for moves between two points. Such factors may include variable friction and break-away forces, the presence of oil or foreign material entering the positioning means and effecting the ability of positioning means to move freely, variable supply pressures and the like.

Potential moves of positioning means 50 are broken down into long moves and short moves to accommodate the effect of all of the various variables of a load moving system, and particularly a load moving system using compressed air as a driving agency, for example, the delay in response time of valves to actuate positioning means 50. If the distance that positioning means 50 must move is such that by the time the valving means 70 has been actuated, sufficient force has been generated by the building pressure in the positioning means to exceed the frictional break-away force of the load, the load has moved to the desired position as determined by sensing means 20 and the valving means 20 is deactuated, the load will have moved beyond the desired position by the time it comes to rest, the positioning system cannot rely upon the sensing means 20 for such short moves to compensate for this problem. Thus, "short moves" are provided for short distance movements of the load, and such "short move" data provides a corresponding interval of time for which the valving means is actuated to move the positioning means over such a short distance. This interval of time may be divided into microseconds if desired.

With positioning systems provided by this invention, it may be necessary or desirable to have potential moves that may require a positioning means 50 whose travel path is divided into many very short moves, in addition to many very long moves and the combination of long move data and short move data can be so large as to exceed the practical limits of reasonably priced data-storage means. To solve this problem, the short move table is structured so that the first five position counts in the short move table each correspond to a single pulse emitted by the encoder (sensing means 20) to provide greater resolution in such short moves and so that the remaining units of the short move time interval each correspond to groups, each having, for example, five position counts located therein.

The mapping or characterizing of the cylinder and the developing of the long move and short move tables allows one to precisely control positioning means 50 by using inexpensive digital encoders as sensing means and conventional on/off valves, and further provides the system with learning capability to accommodate time-dependent variables, among others. For example, as stated above, the long move table breaks the potential movements of piston cylinder 52 into short intervals and the short intervals are then divided into individual cells. Any potential stroke of the piston is composed of and completely mapped out by the intervals or position counts and the cells. In the long move table, each move from any originating cell to any desired cell has a distinct offset distance value for moving the piston cylinder to that desired cell. In regard to the short move table, each move from any originating position count to any desired position count has a separate time value for moving the piston cylinder to that desired position count. The potential moves of the positioning means are broken down into the separate move tables as such so that inexpensive digital valves may be used to achieve quick and accurate positioning of the positioning means and the method of operation provided by the operating program solves the problems encountered by prior pneumatic systems.

The positioning system of this invention further includes a "re-try" capability wherein after each move the positioning means 50, sensing means 20 and microprocessor 30 determine whether positioning means 50 is positioned within specified limits or within the "error band" of the desired position. The system 10 will repeat its operation of sensing and moving positioning means 50 until the system determines that the positioning means is positioned within the predetermined error band.

In addition, after each move of positioning means 50, microprocessor 30 determines any difference between the actual resulting position of the positioning means and the desired position, this difference being referred to as "location error", divides the location error by a predetermined constant and uses this resulting corrective figure to adjust the respective offset distance value of the first set of long move data corresponding to that particular long move, or the respective time interval of the second set of short move data corresponding to that particular short move. During a long move, if, for example, positioning means 50 travels beyond the desired position, the respective offset distance value for that long move is increased by the corrective figure, and the respective offset distance value is decreased if positioning means 50 stops short of the desired position. During a short move, if positioning means 50 travels beyond the desired position, the respective time value stored in the short move table value is decreased by a corrective figure and if positioning means 50 stops short of the desired position, the short move table value is increased by the corrective figure. The short and long move table values are continually adjusted by corrective figures so that the adjustments avoid wide swings in the table values due to, for example, an isolated abnormal move.

The long move and short move table values are adjusted after each move of positioning means 50 regardless of whether the positioning means stops within the error band of the desired position. If positioning means 50 stops outside of the error band, microprocessor 30 adjusts the long move or short move data for the move just made and determines the relevant information needed to effect the desired position of the load. If the positioning means stops within the error band but is not positioned exactly at the desired position, microprocessor 30 will adjust the respective long move or short move data as appropriate but will not instruct that another move be made as the positioning means is positioned within the acceptable error band. This operation results in positioning means 50 being more accurately positioned when the same move is repeated later. This ability allows the system of this invention to be self-adjusting and responsive to changes in the system, such as in the pressure of the fluid employed by the system and in the internal friction experienced by the system.

Figure 4:
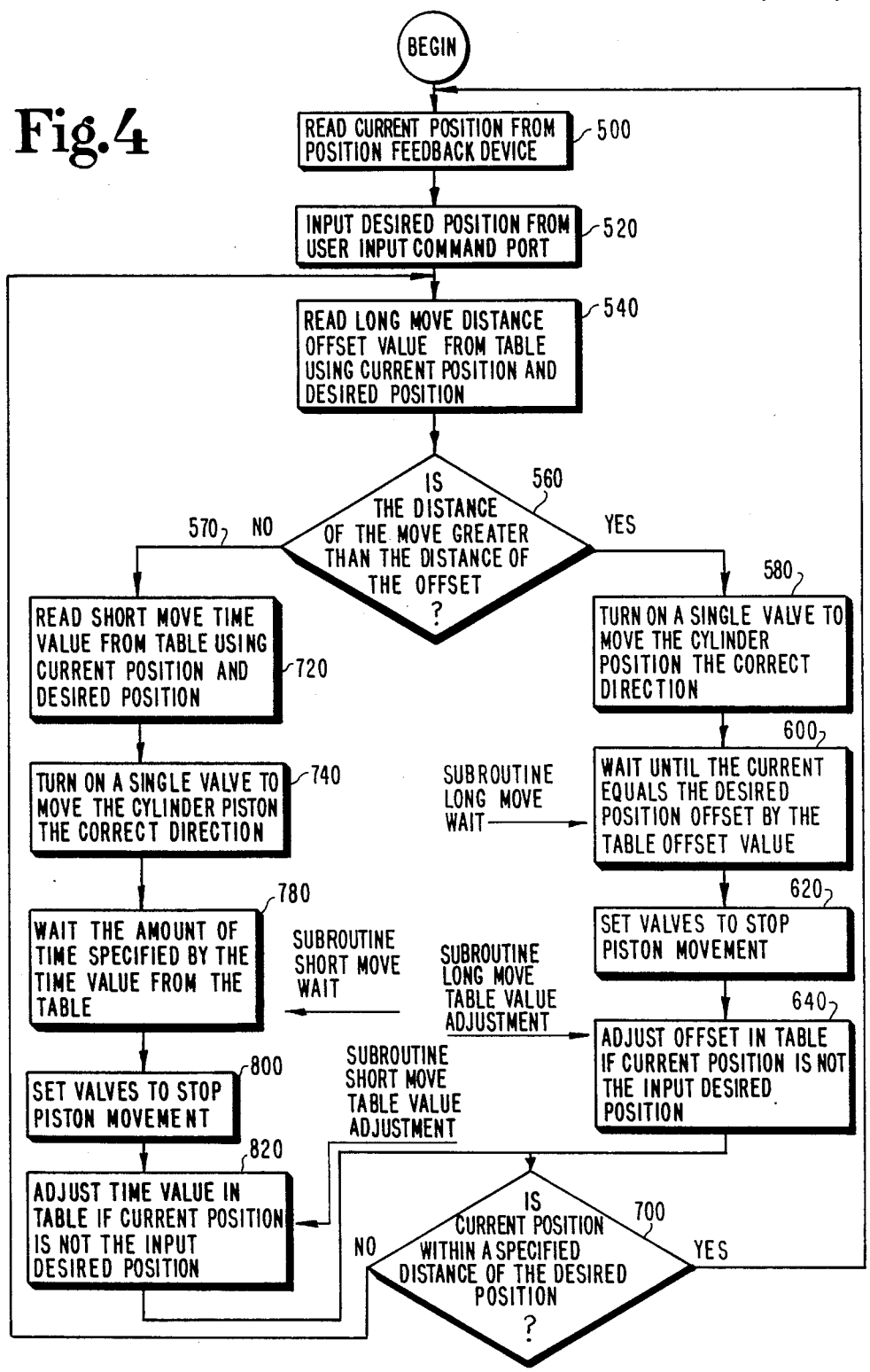
FIG. 4 is a flowchart illustrating a method of operation provided by the invention and a system operating program for a microprocessor and data-storage means of the invention.

Shown in FIG. 4 is a flowchart illustrating a method of operation of the invention and a system operating program for a microprocessor and data-storage means according to this invention. System 10 of this invention initiates a change of position of the load by reading the current position of positioning means 50 as indicated by sensor 20 and shown in box 500. The desired position is then received by the microprocessor indicating the next desired position of positioning means 50 as shown in box 520; this input may be provided by the system operating program stored in data-storage means 40, or by input means via an external communication line. Upon receiving the desired position datum, microprocessor 30 determines the distance or the number of position counts the positioning means must travel to reach the desired position and enters the long move table, or first set of long move data, as the system always attempts to make a long move initially, and retrieves the respective offset distance value for that particular move, as shown in box 540. For example, positioning means 50 may be currently positioned at position count 364 (cell four) and the next desired position may be position count 738 (cell eight). The microprocessor would then enter the long move table and retrieve the offset distance value for the move originating at cell four and stopping at cell eight, which may be 50 position counts. Since the actual move to be made, 374 position counts (738 minus 364), is longer than the offset distance value of 50 position counts for the standard move originating at cell four and stopping at cell four, microprocessor 30 directs valve actuator portion 78 to operate valve 73 or 76 to permit pressurized fluid to enter chamber 52a or 52b, respectively, of cylinder piston 52 as shown in boxes 560 and 580. The pressure within the particular chamber increases to a point at which it overcomes the breakaway force needed to urge stationary piston head 58 in the direction of the desired position and maintain a sufficient motive force to effect the desired position.

Figure 5A:
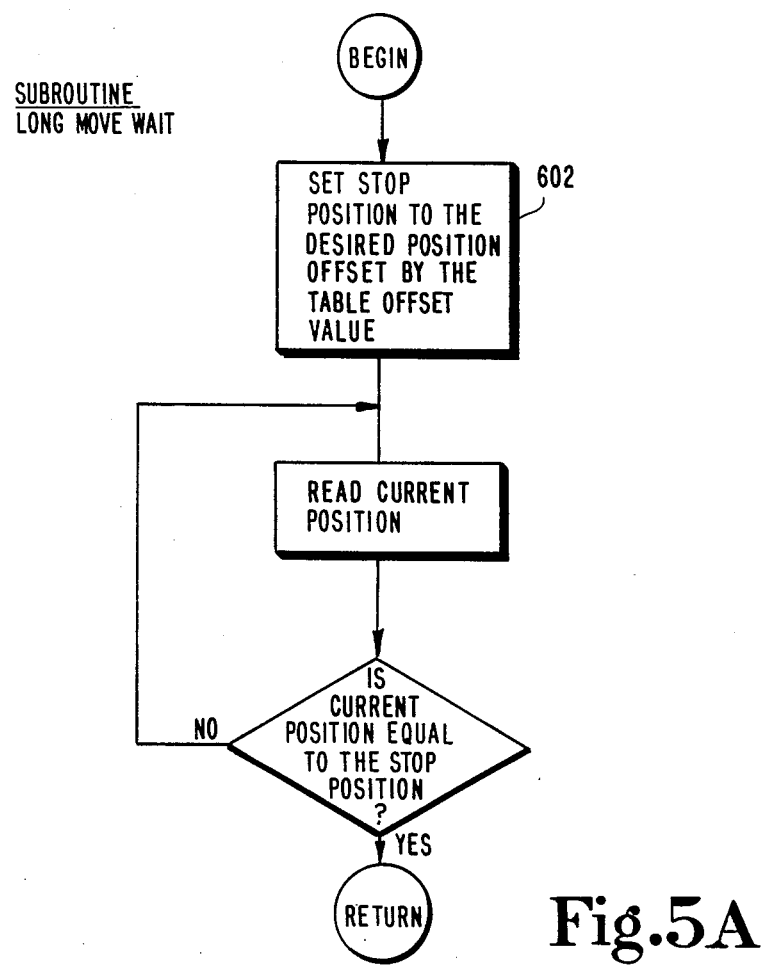
FIG. 5A is a flowchart illustrating the long move wait subroutine of the method of operation and program illustrated in FIG. 4.

During a long move, sensor 20 continuously senses the position of piston head 58 as it travels along its path and continuously directs a signal indicating this position to microprocessor 30. When the sensed position of piston head 58 is equivalent to the offset position, microprocessor 30 instructs valve actuator portion 78 to deactuate valve 73 or 76 to stop the piston head as shown in boxes 600 and 620. As explained above, the system may apply pressure to the opposing chamber to stop the piston head movement, and operation of the system may be effected by releasing pressure on one of the chambers to effect movement of the load. These particular steps of the method of operation are carried out by a long move wait subroutine of the system operating program provided by this invention, a flowchart of which is shown in FIG. 5A and discussed below.

Figure 5B:
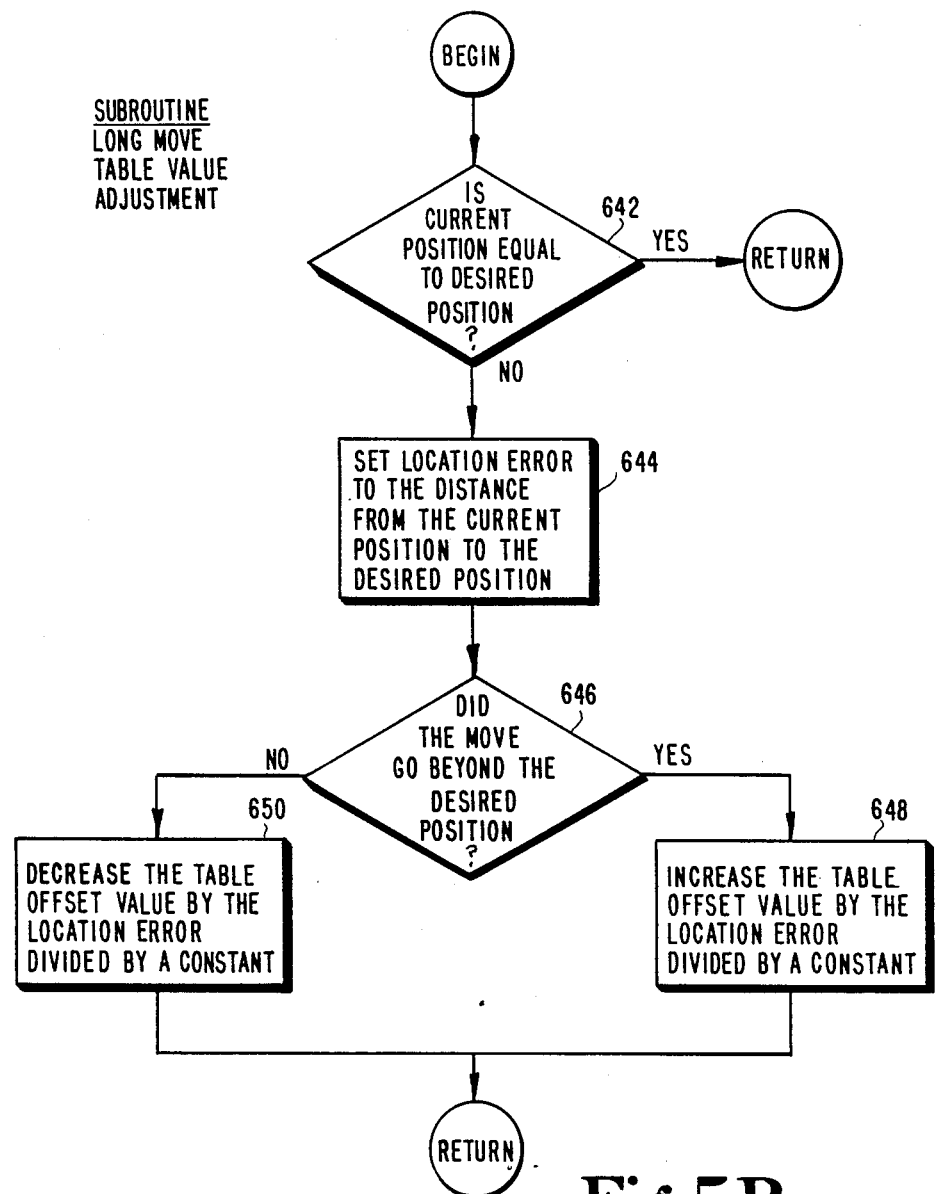
FIG. 5B is a flowchart illustrating the long move table value adjustment subroutine of the method of operation and program illustrated in FIG. 4.

After positioning means 50 stops, its position is indicated by sensor 20 to microprocessor 30 which compares its position to the desired position and determines whether the positioning means is positioned accurately at the desired position and, if the positioning means is not positioned at the desired position, microprocessor 30 determines the distance to effect the desired position and adjusts the respective offset distance value corresponding to that move stored in the long move table. These particular steps of the method of operation are carried out by a long move table value adjustment subroutine of the system operating program provided by this invention, a flowchart of which is shown in FIG. 5B and discussed below.

Figure 6A:
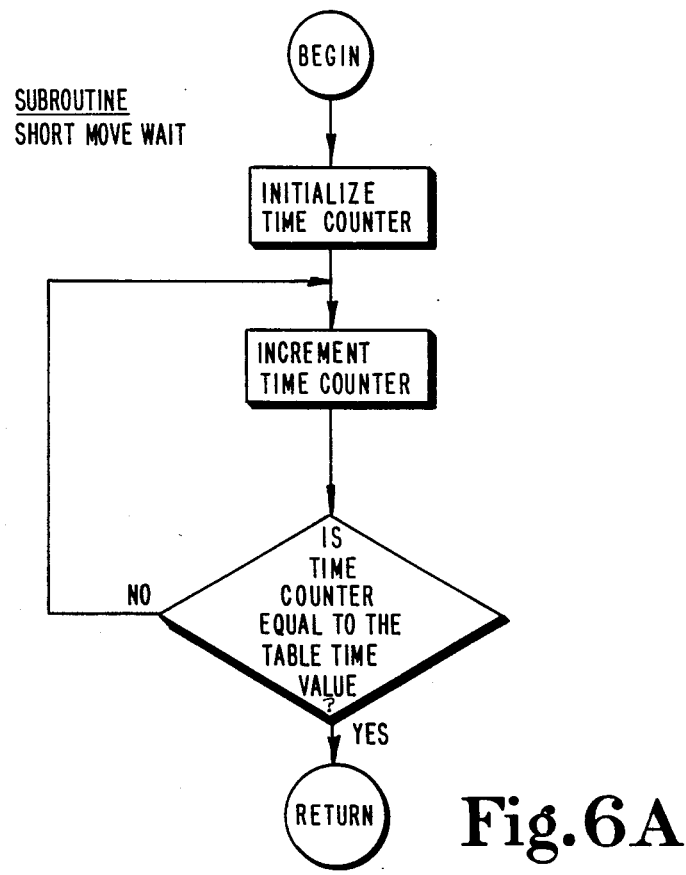
FIG. 6A is a flowchart illustrating the short move wait subroutine of the method of operation and program illustrated in FIG. 4.

After the positioning system has adjusted the corresponding offset distance value in the long move table, microprocessor 30 determines at diamond 700 whether positioning means 50 is positioned within the predetermined acceptable error band. If so, the system has successfully completed the move and is ready for the next position change. If positioning means 50 is not positioned within the error band, system 10 returns to box 540 and microprocessor 30 determines a second distance that positioning means 50 must travel to effect the desired position and again enters the long move table (the system always attempts to perform a long move initially), and retrieves the respective offset distance value for that particular move, shown in box 560, and determines whether the second distance is greater than the offset distance value. If the second distance is at least equal to the offset distance value for the new move, the system repeats the operation at box 580 and the long move process as described above. If the second distance is less than the offset distance value, microprocessor 30 enters the short move table at box 720 to retrieve the time interval for the particular short move and instructs valving means 70 at box 740 to actuate a valve 73 or 76 for the retrieved time interval to deliver pressurized operating fluid to positioning means 50 to move it toward the desired position. Upon the expiration of the retrieved time interval, microprocessor 30 instructs valving means 70 to deactuate valve 73 or 76 at boxes 780 and 800. These particular steps of the method of operation are carried out by a short move wait subroutine of the system operating program provided by this invention, a flowchart of which is shown in FIG. 6A and discussed below.

Figure 6B:
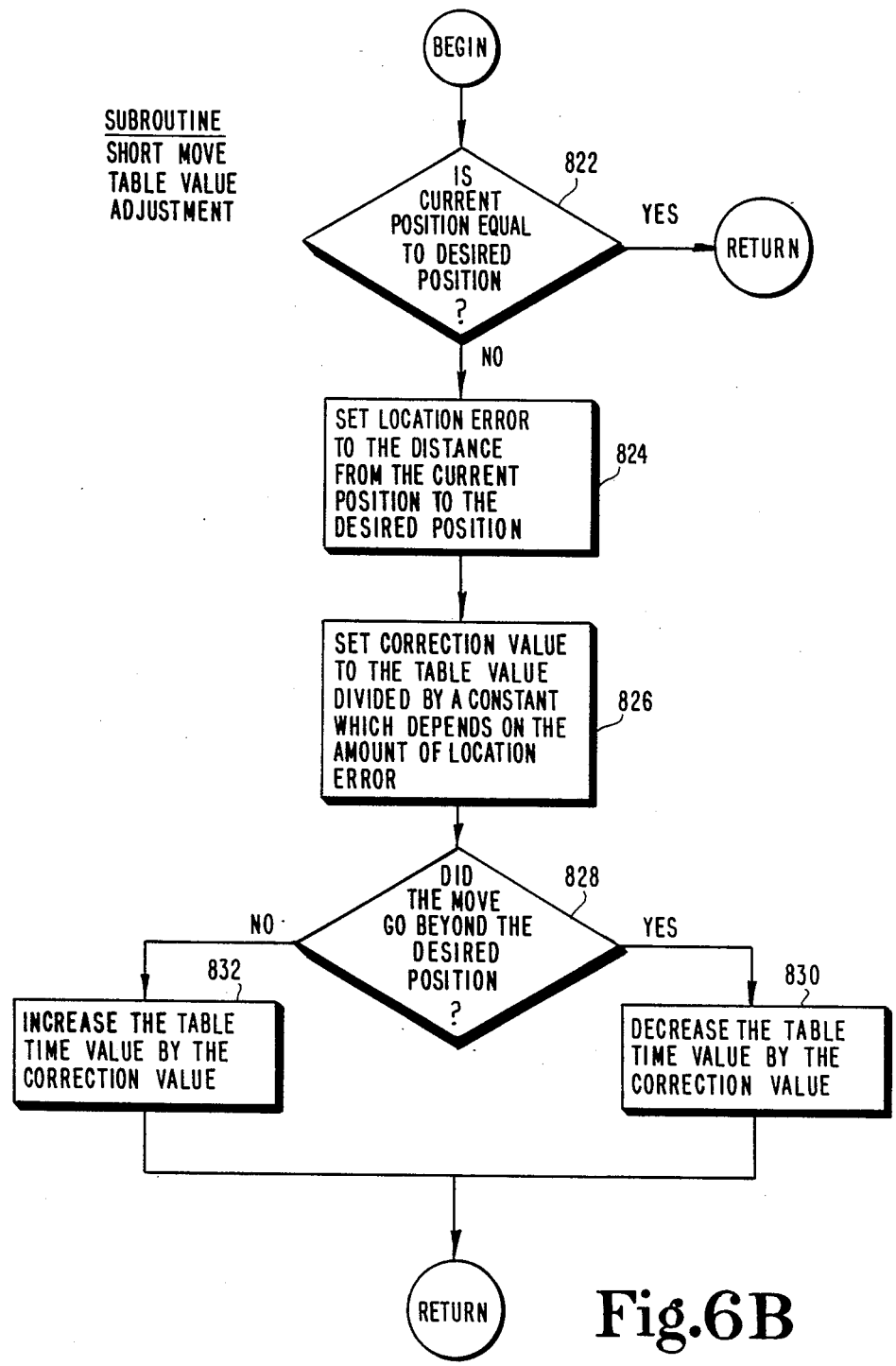
FIG. 6B is a flowchart illustrating the short move table value adjustment subroutine of the method of operation and program illustrated in FIG. 4.

Microprocessor 30 then determines at box 820 whether positioning means 50 is positioned at the desired position and, if so, the system has completed this short move and is ready for the next position change. If positioning means 50 is not positioned at the desired position, microprocessor 30 adjusts the time interval in the short move table for the particular short move. These particular steps are carried out by a short move table value adjustment subroutine of the system operating program provided by this invention, a flowchart of which is shown in FIG. 6B and discussed below.

Microprocessor 30 then determines whether positioning means 50 is positioned within the acceptable error band at box 700, and, if so, the system has successfully completed the move and is ready for the next position change. If positioning means 50 is not positioned within the acceptable error band, system 10 returns to box 540 and repeats the process as described above until positioning means 50 is determined to be positioned within the limits of the error band.

As shown by the long move wait subroutine of FIG. 5A, system 10 offsets the desired position by the offset distance value retrieved from the long move table corresponding to the particular long move to generate an offset position at box 602. In the prior example, positioning means 50 is positioned at position count 364 (cell four) and the desired position is position count 738 (cell eight), so microprocessor 30 enters the long move table and retrieves the offset distance value corresponding to the move originating at cell four and stopping at cell eight, which is 50 counts, and adjusts the desired position to arrive at an offset position of 688 (738 minus 50).

Once the offset position is determined, microprocessor 30 directs valving means 70 to deliver pressurized operating fluid to move the driving means toward the desired position. It is to be remembered that operation of the system of this invention may be effected by pressurizing both chambers 52a and 52b to maintain a stationary position of piston head 58 and releasing pressure in one of the chambers to effect movement of the load. As piston head 58 travels along its path, sensor 20 continuously senses its position and directs a corresponding signal to microprocessor 30 and when the piston head reaches the offset position, microprocessor 30 directs valving means 70 to discontinue the delivery of the pressurized operating fluid to piston cylinder 52 permitting the piston head to stop unassisted at or near the desired position.

As shown by the long move table value adjustment of FIG. 5B, after positioning means 50 stops after a long move, system 10 determines whether it is positioned at the desired position at diamond 642 and, if so, the move has been successfully completed. If positioning means 50 is not positioned at the desired position, notwithstanding the positioning means stopping within the error band, microprocessor 30 determines a new distance, the location error, between positioning means 50 and the desired position to effect the desired position at box 644, and determines whether the positioning means stopped beyond the desired position or stopped short of the desired position at diamond 646. If positioning means 50 stops beyond the desired position, the system increases the respective offset distance value stored in the long move table by the corrective figure defined by the location error divided by a predetermined constant, at box 648. If positioning means 50 stops short of the desired position, the system decreases the respective offset distance value stored in the long move table by the corrective figure. In most instances after an initial move of positioning means 50, any location error will be less than the respective offset distance value and microprocessor 30 will proceed to initiate a short move. After increasing or decreasing the respective offset distance value, system 10 proceeds with the operation shown in diamond 700 of FIG. 4.

As shown by the short move wait subroutine of FIG. 6A, the method of operation provided by the system operating program includes a simple time counting procedure in which the time counter is initialized to zero value and then actuated upon the actuation of one of the operating valves 73 or 76. Once the time counter reaches the time interval retrieved from the short move table, microprocessor 30 directs valving means 70 to deactuate the operating valves to stop the movement of the positioning means.

As shown by the short move table value adjustment subroutine of FIG. 6B, if positioning means 50 is not positioned at the desired position after it comes to a rest after a short move as shown in diamond 822, microprocessor 30 determines a corrective figure to adjust the time interval stored in the short move table at box 824, again, the corrective figure being the location error divided by a predetermined constant which then corresponds to a corrective time figure at box 826. System 10 then determines at diamond 828 whether positioning means 50 stopped beyond the desired position and, if so, the respective time interval for the particular short move is decreased by the corrective time figure at box 830. If positioning means 50 stopped short of the desired position, the respective time interval is increased by the corrective time figure at box 832. After increasing or decreasing the respective time interval, system 10 proceeds with the operation shown in diamond 700 of FIG. 4.

The following is another example of how a series of movements is effected by the positioning system provided by this invention. The following assumptions are made for the purpose of this example: the maximum stroke length of positioning means 50 is one inch; the maximum position count of positioning means 50 is 1,000; the operating program stored in data-storage means 40 divides the one inch distance, comprising 1,000 position counts, into ten equal cells each having 100 position counts therein; and positioning means 50 has already learned its environment so that the long move and short move tables have been provided offset distance values and time intervals, respectively, which are now stored in them. For purposes of the example, positioning means 50 is originally positioned at position count 960 (cell ten) and the desired position is position count 550 (cell six). The distance between the current position of positioning means 50 and the desired position is determined by the system to be 450 counts. Microprocessor 30 enters the long move table as the system always tries to perform a long move initially and compares the respective offset distance value for the move originating at cell ten and ending at cell six to the move distance. If, for example, the offset distance value for such a move is 120 counts, the system will make a long move as the distance positioning means 50 must move to reach the desired position is 450 position counts, which exceeds the offset distance value of 120 position counts for the particular move. System 10 then determines the offset position by adjusting the desired position by the respective offset distance value. In this example, the offset position will be at 670 position counts (550 +120). To initiate the move, microprocessor 30 instructs valving means 70 to direct pressurized operating fluid, in the manner discussed above, to move the positioning means towards position count 550. As positioning means 50 moves toward count 670, sensing means 20 continuously indicates its position to microprocessor 30 and when the positioning means reaches the offset position (position 670), microprocessor 30 instructs valving means 70 to discontinue providing the pressurized operating fluid to the positioning means and positioning means 50 should come to a rest at position count 550. It is possible, however, that positioning means 50 will not stop precisely at position count 550 and it may stop, for example, at position count 605 in cell seven. Immediately after the positioning means stops, system 10 determines the location error to be 55 position counts (605 minus 550). The location error is then divided by a constant and the resulting figure used to adjust the respective offset distance value stored in the long move table for a move originating at cell ten and ending at cell six. By this process, the system learns its environment and continuously adjusts its operating parameters to assure its accuracy during subsequent moves.

The system of this invention continues to move positioning means 50 until it is positioned within the acceptable error band of the desired position. The error band may be preset by the operator, for example, to be within 5 position counts either side of the desired position. In the example, the desired position is at count 550 and the position of positioning means 50 is at position count 605, resulting in a difference of 55 position counts. Since this difference is greater than the error band of ±5 position counts, the system will initiate another move in an attempt to position positioning means 50 within the error band. Thus, microprocessor 30 enters the long move table and compares the respective offset distance value for a move originating from the new cell (cell seven) to cell six. Assuming that this offset distance value is greater than the new move distance of 55 position counts, the system will not perform a long move and microprocessor 30 will enter the short move table and retrieve the respective time interval for a move distance of 55 position counts from position count 605. System 10 then actuates valving means 70 to move positioning means 50 toward location count 550, the desired position, and waits the time interval retrieved from the short move table and, upon the expiration of the time interval, deactuates valving means 70 to stop positioning means 50.

After positioning means 50 comes to a rest, microprocessor 30 initially adjusts the short move table value for moving a distance of 55 position counts from position count 605 to position count 550 by increasing or decreasing the respective time interval depending on whether positioning means 50 stops beyond count short of the desired position count. Assuming positioning means 50 stopped at location count 547, the time value in the short move table will be decreased by the corrective figure, yet, the move is now considered complete since positioning means 50 is displaced only 3 position counts from the desired position count 550 and this is within the acceptable error band of ±5 position counts.

The type of encoder to be included as the sensing means in this system depends on the output variable, the load and the required accuracy. A displacement sensor integrated within a cylinder is often preferred. Unfortunately, pneumatic cylinders usually cannot accommodate an internal displacement pickup because their cylinders are too small to allow for the tubular cross section that is required. For displacement sensors that are integrated with pneumatic cylinders, analog and digital devices are available. Analog devices such as linear potentiometers operate with slight linear deviations of less than approximately ±0.05% of overall travel. In general, the measuring accuracy of measuring transducers becomes poorer as the measured distance increases. Therefore, analog displacement pickups are practical only where measured distances are short, if high absolute accuracy is required.

Digital displacement pickups, on the other hand, or glass measuring bars, offer accuracies of approximately ±0.01 mm over one meter of measured length, even where measured distances are long. Such precision, however, is reflected in the higher cost of these devices. When using such a device, a slide guide is required when the device is used with pneumatic cylinders.

The group of digital displacement pickups are further subdivided into incremental and absolute pickups. Incremental displacement pick-ups are generally more widely used. In these devices, marks on the measuring bar are totalled by a counter on a controller board, thus providing displacement information.

A major benefit of a pneumatic system such as provided by this invention is free programmability. This allows a virtually limitless variety of operations with a single system, and the ability to quickly and easily change operation.

During operation, the microprocessor is provided data representing the next desired position of the load from a data-storage means and compares this information to the position of the load received from the sensing means and determines the distance and direction the load must be moved to reach the desired position. The microprocessor then compares the change of position and distance to the first set of long move data and, if the distance to be moved is at least equal to the predetermined minimum offset distance value corresponding to the desired move, the microprocessor retrieves the offset distance value corresponding to the desired move and adjusts the next desired position by the offset distance value to determined the interval of operation of the controlled valving means to yield the desired position. The microprocessor then directs an output signal to the valving means for the determined interval of operation.

If the distance between the present position of the positioning means and the next desired position is less than the predetermined offset distance value for the particular move, the microprocessor then compares the distance to the second set of short move data and retrieves the single integral of time corresponding to the particular move. The microprocessor then directs an output signal to the valving means for the determined interval of operation.

The valving means receives the output signal, whether it be generated from the first set of long move data or the second set of short move data, and opens for the determined interval of operation, permitting pressurized gas to be delivered to the pneumatic cylinder to move the cylinder in the direction of the desired position. When the valving means receives a long move output signal, the sensing means continuously senses the position of the positioning means and directs the plurality of position output signals to the microprocessor while the positioning means is in motion. When the microprocessor determines that the positioning means has reached the offset position provided by the output signal (i.e., the desired position corrected by the offset distance value), the microprocessor directs the valving means to deactuate the positioning means. This long move mode of operation should result in the positioning means stopping at or near the desired input position. When a short move output signal is generated by the microprocessor, the valving means is actuated only for an interval of time equal to the determined short time interval represented by the short move output signal and after the valving means is deactuated, the positioning means should be at or very near the next desired position.

After the positioning means has stopped, the microprocessor determines whether the load is positioned at the desired position and, if not, adjusts the respective offset distance value or the time interval, as appropriate. The microprocessor then determines whether the positioning means came to rest within a predetermined margin or error, or "error band". If the load is not positioned within the error band, the microprocessor determines a second distance between the existing incorrect position of the load and the desired position. The microprocessor then repeats its operation, comparing the existing incorrect position to the desired position to determine the distance to be moved, determining the offset distance value corresponding to the needed move, determining whether the needed move should be accomplished by "long move" operation or by "short move" operation and generating an appropriate output signal which is received by the valving means which, in turn, repeats its operation as set forth above. This sequence is repeated until the microprocessor determines that the load is positioned within the error band.

As stated above, after each movement of the load, the microprocessor takes any difference between the position of the load after it has stopped and the desired position of the load, divides the difference to a constant to obtain a corrective adjustment and either adjusts the offset distance value of the first set of long move data corresponding to the particular long move, or the short time interval of the second set of short move data corresponding to the particular short move, as appropriate, with the resulting corrective adjustment. This ability allows the system to be self-adjusting and responsive to all of the various sources of variation such as changes in the pressure of the pressurized gas applied to the positioning means and changes in the frictional, inertial and other forces experienced by the system.

The invention thus includes an air cylinder that accepts commands from a computer program stored in a microprocessor which has memory capability. The cylinder is instructed to move its piston specified distances varying in amount from very small distances, such as 0.002 inches (0.05 mm), up to the maximum travel of the cylinder, and is able to communicate with any computer or industrial controller on a factory floor. The invention enables the host computer or microprocessor to engage in multi-tasking and, using easy set-up commands. Operators may create a set of performance features unique to each task as desired. These features can be then automatically stored in the cylinder's memory means. For certain applications, greater accuracy and less speed is desired; and for other applications, greater speed and less accuracy is desired. Applications of the latter type may be executed without having the cylinder "hunt" for a very accurate position as most connection closed-loop systems must. The microprocessor-controlled pneumatic cylinder of the invention may be made available to the public at a cost nearly half of the cost of conventional systems.

The ability of the system to adjust the information stored in the long move and short move tables renders the system self-adjusting and enables the system to accommodate many system variables, and allows the system to operate quickly and accurately over prolonged periods of operation.

This invention is not limited to the preferred embodiments and methods described above and should be limited only by the scope of the following claims and their equivalents.

We claim:

1. A method of positioning a pneumatically-driven load accurately to a plurality of desired positions in the presence of unpredictable variables, comprising:

dividing a path of travel of the load into a multiplicity of short intervals;

characterizing the path of travel of the load into a plurality of path portions, each path portion including several of the short intervals;

providing a data-storage means with data corresponding to movement of the load over the plurality of path portions and multiplicity of short intervals, said data including a set of long move data including an offset distance value for movement of the load over each of the plurality of path portions and a set of short move data including a time interval for movement of the load over one and a plurality of said short intervals from each of the plurality of path portions;

determining a current position and a desired position of the load and the path of load movement therebetween;

determining from said sets of long move data and short move data one or more intervals of application of pneumatic force to said load to effect the desired position, said one or more intervals of pneumatic force application being effected by determining for the path of load movement, the offset distance value and if the path of movement exceeds the offset distance value, applying pneumatic force to the load and sensing load position as the load moves until the sensor indicates the load is at a first position equal to the desired position adjusted by the offset distance value, and if the path of load movement is less than the offset distance value, determining from the set of short move data the time interval corresponding to the path of movement and applying pneumatic force to the load for the determined time interval.

2. The method of claim 1 further comprising the steps of sensing the position of the load each time movement of the load has stopped, determining the difference between actual load position and desired load position and a corrective adjustment to the offset distance value or the time interval for the path of movement of the load, and adjusting the offset distance value or time interval for the path of movement by the corrective adjustment.

3. A method for positioning a driving means to a plurality of desired positions along a path, said driving means being mechanically coupled to a load, comprising the steps of:

sensing the position of the driving means;

determining a desired position of the driving means;

comparing the position of the driving means to the desired position of the driving means and determining a first distance between the position of the driving means and the desired position of the driving means;

comparing said first distance to a first set of long move data provided by a data-storage means, said first set of long move data having a plurality of predetermined, incremental moves and a plurality of predetermined offset distance values, each of the plurality of moves having a single offset distance value corresponding thereto, said offset distance value representing a point along the path of the move of the driving means at which motive force for the driving means is discontinued to effect the desired position;

comparing said first distance to said predetermined offset distance value for the move from the current position of the driving means to the desired position of the driving means and if the first distance exceeds the predetermined offset distance value;

adjusting the desired position by said offset distance value whereby an initial offset position is determined to effect the desired position;

generating an initial long move output to move said driving means;

sensing the position of the driving means as the load is moved initially toward the desired position and continuing said long move output until the driving means reaches a position representing said initial offset position;

if said first distance is less than the offset distance value corresponding to said move, comparing said first distance to a second set of short move data provided by the data-storage means, said second set of short move data having a plurality of predetermined units of distance and a plurality of predetermined intervals of time associated with each of the plurality of path portions, each of said plurality of predetermined units of distance corresponding to a single interval of time;

generating an initial short move output to said driving means for said time interval corresponding to said move to effect such desired position.

4. The method as in claim 3 further comprising the steps of:

sensing the position of the driving means after its initial movement has stopped and comparing said position to the desired position of the driving means to determine if the driving means is positioned within a predetermined acceptable error band of the desired input position and, if the driving means is not positioned within said error band, determining a second distance of a subsequent move between the position of the driving means and the desired position of the driving means to effect such desired position;

comparing said second distance to the first set of long move data and, if said second distance is at least equal to the offset distance value corresponding to the subsequent move, generating a subsequent long move output, said subsequent long move output representing a subsequent offset position, and providing a subsequent motive force to move the driving means in the direction of the desired position and sensing the position of the driving means as the load is moved toward the desired position and continuing the subsequent motive force until the driving means reaches a position representing said subsequent offset position;

if said second distance is less than the offset distance value corresponding to the subsequent move, comparing said second distance to the second set of short move data and generating a subsequent short move output, said subsequent short move output representing a second time interval corresponding to said subsequent move, and providing a subsequent motive force to move the driving means in the direction of the desired position for said second time interval to effect such desired position; and repeating the operation until the driving means is determined to be positioned within the error band of the desired position.

5. The method as in claim 4 further comprising the steps of:

determining the difference between the desired position of the driving means and the position of the driving means after each movement of the driving means, and adjusting the stored offset distance value within the first set of long move data and the stored time interval within the second set of short move data, as appropriate, by said difference divided by a predetermined constant, whereby a resultant offset distance value and time interval is generated corresponding more accurately to said move.

6. The method as in claim 3 wherein said step of determining a desired position of the driving means is carried out by an operating program stored in said data-storage means providing the desired position.

7. The method as in claim 3 wherein said step of determining a desired position of the driving means is carried out by an operator providing the desired position through an input means via an external communication line.

8. The method as in claim 3 wherein the determining of the first distance between the current position of the driving means and the desired position includes converting the position of the driving means to a digital electrical signal corresponding to said position, said digital electrical signal being received by an electronic data processing means.

9. The method as in claim 3 wherein the first set of long move data and the second set of short move data are provided to the data-storage means prior to operation.

10. The method as in claim 9 wherein said sensing step is carried out by an encoding device, and wherein the providing of the first set of long move data and the second set of short move data to the data-storage means includes the steps of:

characterizing the path of the driving means by assigning to the path a predetermined multiplicity of short intervals, each corresponding to a single sensed position change, said multiplicity of short intervals being spaced evenly along said path;

dividing the multiplicity of short intervals into a plurality of non-overlapping portions of equal length, each portion having an equal number of short intervals located therein;

moving the driving means from each portion to every other portion along the path, thereby generating a plurality of long moves, and determining for each long move the offset distance value corresponding to said long move and storing each said long move and the corresponding offset distance value in the first set of long move data stored in the data-storage means; and moving the driving means from each portion to each of a plurality of predetermined units of distance, thereby generating a plurality of short moves, and determining for each short move a time interval corresponding to said short move and storing each short move and the corresponding time interval in the second set of short move data stored in the data-storage means.

11. The method as in claim 3 wherein said long move output and said short move output provide the motive force to move the driving means by a valving means coupled to said driving means, said valving means being connected to a source of pressurized fluid and providing pressurized fluid to move said driving means upon said valving means receiving said long move output and short move output, said driving means comprising a linear-drive cylinder.

12. The method as in claim 11 further comprising the step of securing the linear-drive cylinder after its movement has stopped by a linear cylinder brake arranged adjacent the linear-drive cylinder, said brake engaging mechanically the linear-drive cylinder and resisting further movement thereof.

13. The method as in claim 3 wherein said long move output and said short move output provide the driving force to move the driving means by a valving means coupled to said driving means, said valving means being connected to a source of pressurized fluid and providing pressurized fluid to move said driving means upon said valving means receiving said long move and a short move output, said driving means comprising a rotary actuator.

14. The method as in claim 13 further comprising the step of securing the rotary actuator after its movement has stopped by a rotary brake arranged adjacent said rotary actuator, said rotary brake engaging electromagnetically the rotary actuator and resisting further movement thereof.

15. The method as in claim 3 wherein the step of adjusting the stored offset distance value within the first set of long move data includes increasing the stored offset distance value corresponding to the long move by the difference divided by a predetermined constant if the driving means stops beyond the desired position, and decreasing the stored offset distance value corresponding to the long move by said difference divided by a predetermined constant if the driving means stops short of the desired position.

16. The method as in claim 3 wherein said step of adjusting the stored time interval within the second set of short move data includes decreasing the stored time interval corresponding to the short move by said difference divided by a predetermined constant if the driving means stops beyond the desired position, and increasing the stored time interval corresponding to the short move if the driving means stops short of the desired position.

17. An apparatus for positioning a load in a plurality of desired positions, comprising:
a load positioning means;
means to provide motive force to the load positioning means;
means to input data or a desired position of the load;
a digital data processing and storage means;
sensor means for sensing the position of the load and providing said digital data processing and storage means with the current position of the load,
said positioning means being operable to position the load with a long move mode of operation and a short move mode of operation, said long move mode of operation providing motive force to move the positioning means from the current position toward a desired position while sensing the position of the load during such movement and discontinuing the motive force at one of a plurality of predetermined offset distances for load movement from the current position to one of a plurality of desired positions, said short move made of operation providing motive force to move the positioning means from the current position toward a desired position for one of a plurality of predetermined short time intervals corresponding to one of a plurality of desired positions.

18. The apparatus of claim 17 wherein the digital data processing and storage means is provided with a set of long move data including a plurality of predetermined offset distance corresponding to a plurality of long moves of the load and a set of short move data including a plurality of predetermined short time intervals corresponding to a plurality of short moves of the load.

19. The apparatus of claim 17 wherein said means to provide motive force to said positioning means comprises a source of compressed gas and a valving means.

20. The apparatus of claim 19 wherein said digital data processing and storage means senses the difference between the position of the load and the desired position after each movement of the load and develops a correction for the predetermined offset distance value or the predetermined short time interval used to effect that movement.

21. The apparatus of claim 19 wherein said digital data processing and storage means senses the difference between the position of the load and the desired position of the load and determines a subsequent move to be effected if the position of the load is not within a predetermined acceptable error distance from the desired position.

22. An apparatus for positioning a driving means mechanically coupled to a load by a plurality of moves to a plurality of desired positions, comprising:
driving means;
electronic data processing means;
means for inputting a desired position;
data-storage means coupled to said electronic data processing means;
means for sensing the position of the driving means and providing an output signal indicating said position to the electronic data processing means;
valving means for actuating said driving means; and
a pressure gas source coupled to said valving means,
said electronic data processing means receiving data representing the desired position of the driving means and the position of the driving means,
determining a first distance between the position of the driving means and the desired position of the driving means,
comparing said first distance to a first set of long move data provided by said data-storage means, said first set of long move data having a plurality of predetermined moves and a corresponding plurality of predetermined offset distance values, each of the plurality of moves having a single offset distance value corresponding thereto, said offset distance value representing a point along the path of travel of the driving means at which the driving means is disabled to effect the desired position,
retrieving the offset distance value corresponding to said move and making a decision,
and if said first distance is at least equal to the offset distance value corresponding to said move, offsetting the desired position by said offset distance value to determine an initial offset position,
generating an initial long move output and directing said initial long move output to said valving means which actuates the driving means and while said sensing means is thereafter providing an output signal indicating the position of the driving means until said sensing means indicates the initial offset position,
and if said first distance is less than the predetermined offset distance value corresponding to said move, comparing said first distance to a second set of short move data provided by the data-storage means, said second set of short move data having a plurality of predetermined units of distance and a plurality of predetermined time intervals associated with each of the plurality of path portions,
generating an initial short move output for said interval of time corresponding to said move and directing said initial short move output to said valving means which actuates the driving means for said time interval.

23. The apparatus of claim 22 wherein said valving means receives the initial long move output and provides pressurized gas to said driving means to initially move the driving means in the direction of the desired position, said sensing means continuously senses the position of the driving means and directs a continuous plurality of corresponding position output signals to said electronic data processing means, said electronic data processing means directing said valving means to discontinue the delivery of pressurized gas to said driving means when the driving means reaches the initial offset position, and
wherein said valving means receives said initial short move output and provides pressurized gas to said driving means to initially move the driving means in the direction of the desired position, said valving means actuating said driving means for a duration of time equal to said time interval corresponding to said short move.

24. The apparatus as in claim 22 wherein said sensing means senses the position of the driving means after the initial movement has stopped and directs a second position output signal indicating said position to the electronic data processing means, said electronic data processing means determines whether the driving means is positioned within a predetermined, acceptable error distance from the desired location and, if said driving means is not positioned within the error distance from the desired position, determines a second distance between the position of the driving means and the desired position to effect such desired position, and wherein said electronic data processing means compares the second distance to the first said of long move data and, if said second distance is at least equal to the predetermined offset distance value corresponding to that move, generates a subsequent long move output signal and directs the subsequent long move output signal to the valving means, said subsequent long move output signal representing a subsequent offset position, and wherein said valving means receives the subsequent long move output signal and provides pressurized gas to said driving means to move said driving means in the direction of the desired position, said sensing means continuously senses the position of the driving means and directs a continuous plurality of corresponding position output signals to said electronic data processing means, said electronic data processing means directs said valving means to discontinue the delivery of pressurized gas to said driving means when the driving means reaches the subsequent offset position, thereby allowing said driving means to slide unassisted to the desired position, and wherein said sensing means continuously senses the position of the driving means and directs corresponding position output signals to said electronic data processing means, said electronic data processing means continuously determines whether the driving means is positioned within the error distance from the desired position and directs output signals to the valving means to actuate the driving means until the driving means is determined to be positioned within the error distance for the desired position.

25. The apparatus as in claim 22 wherein the sensing means senses the position of the driving means after the initial movement has stopped and directs a second position output signal indicating said position to the electronic data processing means, said electronic data processing means determines whether the driving means is positioned within a predetermined, acceptable error distance from the desired location and, if said driving means is not positioned within the error distance from the desired position, determining a second distance between the position of the driving means and the desired position to effect such desired position, and wherein said electronic processing means compares the second distance to the second set of short move data and if the second distance is less than the predetermined offset distance value corresponding to said move, generates a subsequent short move output signal and directs the subsequent short move output signal to the valving means, said subsequent short move output signal representing the time interval corresponding to the second short move, and wherein said valving means receives the subsequent short move output signal and provides pressurized gas to said driving means to move said driving means in tee direction of the desired position, said valving means actuates said driving means for a duration of time equal to the time interval corresponding to said short move, thereby allowing the driving means to slide unassisted to the desired position, and wherein said sensing means continuously senses the position of the driving means and directs position output signals to said electronic data processing means, said electronic data processing means continuously determines whether the driving means is positioned within the error distance from the desired position and directs output signals to the valving means to actuate the driving means until the driving means is determined to be positioned within the error distance from the desired position.

26. The apparatus as in claim 22 wherein said electronic data processing means determines the difference between the desired position of the driving means and the position of the driving means after each movement of the driving means and adjusts the offset distance value stored in the first set of long move data and the separate time interval stored in the second set of short move data, as appropriate, by the difference divided by a predetermined constant, whereby a resultant offset value distance and time interval is generated corresponding more accurately to the move.

27. The apparatus as in claim 22 wherein said electronic processing means comprises a microprocessor.

28. The apparatus as in claim 22 wherein said sensing means comprises an optical encoder module.

29. The apparatus as in claim 22 wherein said electronic data processing means receives said desired position provided by an operating program stored in said data-storage means.

30. The apparatus as in claim 22 wherein said electronic data processing means receives the desired position data provided by an operator through an input means via an external communication line.

31. The apparatus as in claim 22 wherein said driving means comprises a pneumatically controlled rotary actuator.

32. The apparatus as in claim 31 further comprising a rotary brake arranged adjacent the rotary actuator, said brake engaging electromagnetically said rotary actuator after the motion of the driving means has stopped, thereby resisting further movement of the driving means.

33. The apparatus as in claim 22 wherein said driving means comprises a pneumatically controlled linear-drive cylinder.

34. The apparatus as in claim 33 further comprising a linear cylinder brake arranged adjacent the linear-drive cylinder, said brake engaging mechanically said linear-drive cylinder after the motion of the driving means has stopped, thereby resisting further movement of the driving means.

35. The apparatus as in claim 22 wherein said data-storage means is provided with the first set of long move data, the second set of short move data and the plurality of desired positions prior to operation.

36. The apparatus as in claim 35 wherein the data-storage means is provided with the first set of long move data and the second set of short move data by characterizing the path of the driving means by assigning to the path a predetermined multiplicity of short intervals, each corresponding to a single sensed position change, the multiplicity of short intervals being spaced evenly along said path, and dividing the multiplicity of short intervals into a plurality of non-overlapping cell portions of equal length, each cell portion having an equal number of short intervals located therein, and said operating program directing the valving means to move the driving means from each cell portion to every other cell portion along the path, thereby generating a plurality of long moves, and determining the offset distance value corresponding to each said long move and storing the long move and the corresponding offset distance value in the first set of long move data, and directing the valving means to move the driving means from each cell portion to each of a plurality of predetermined units of distance, thereby generating a plurality of short moves, and determining the time interval to effect each short move and storing the short move and the corresponding time interval in the second set of short move data.

37. The apparatus as in claim 22 further comprising input means electronically coupled to said electronic data processing means and first and second conduit means for directing said pressurized gas from said valving means to said driving means.

38. The apparatus as in claim 37 wherein said driving means comprises a positioning drive cylinder having a cylindrical side wall and two end walls and carrying at least one piston head therein, said at least one piston head defining a first and second chamber within said positioning drive cylinder and being mechanically coupled to said load, said positioning drive cylinder having a first orifice formed therein opening into said first chamber and a second orifice formed therein opening into said second chamber, and wherein said valving means includes a first valve, a second valve and a valve actuating portion, and wherein said first conduit means is connected to said first valve of said valving means at one end and to said first orifice formed in said positioning drive cylinder at the other end, said second conduit means is connected to said second valve of said valving means at one end and to said second orifice formed in said positioning drive cylinder at the other end.

39. The apparatus as in claim 38 wherein said driving means comprises a linear-drive cylinder, said linear-drive cylinder including a single piston head carried within said cylinder, a piston rod connected to said piston head, and a sealable orifice formed in one of said two end walls of said cylinder, said piston rod extending through said sealable orifice and connecting to said load.

40. The apparatus as in claim 39 further comprising a braking means comprising a linear air cylinder brake positioned adjacent said piston rod, said piston rod having a metallic band positioned parallel and attached thereto, said brake being actuated by said electronic data processing means to mechanically engage said metallic band after said linear-drive cylinder is stationary, thereby resisting movement of the piston rod and, in turn, the load.

41. The apparatus as in claim 38 wherein said driving means comprises a rotary actuator, said rotary actuator including at least two piston heads positioned therein, a first movable rack interposed between said first and second piston heads, a first gear positioned in communication with said first movable rack, a shaft journaled for rotation affixed to said first gear, a second movable rack mechanically coupled to said load, a second gear positioned in communication with said second movable rack affixed to the end of said journaled shaft opposite said first gear, said first and second gears being affixed to said journaled shaft to allow cooperative movement therebetween.

42. The apparatus as in claim 41 further comprising a braking means comprising a rotary brake positioned adjacent said rotary actuator, said brake being actuated by said electronic data processing means to electromagnetically engage said rotary actuator after said rotary actuator is stationary, thereby resisting movement of the rotary actuator and, in turn, the load.

43. The apparatus as in claim 38 wherein each of said first and second valves is a non-proportional on/off valve.

44. The apparatus as in claim 38 wherein said valving means directs pressurized gas through each of said first and second valves and, in turn, into said first and second chamber of said positioning drive cylinder to secure said at least one piston head in a stationary position, and discontinues the flow of pressurized gas through one of said first or second valve to cause said at least one piston head to be urged in the direction of the desired position by the pressurized gas being directed through the other valve.

45. The apparatus as in claim 38 wherein said valving means discontinues the flow of pressurized gas simultaneously through said first or second valve to bring said at least one piston head to a stationary position and directs pressurized gas through only one of said first or second valve to urge said at least one piston head in the direction of the desired position.

* * * * *